3,226,983
INDUCTION PICKOFF DEVICE
Joseph C. Boltinghouse and Edgar B. Romberg, Whittier, Calif., assignors to North American Aviation, Inc.
Filed Dec. 8, 1961, Ser. No. 158,055
5 Claims. (Cl. 74—5.6)

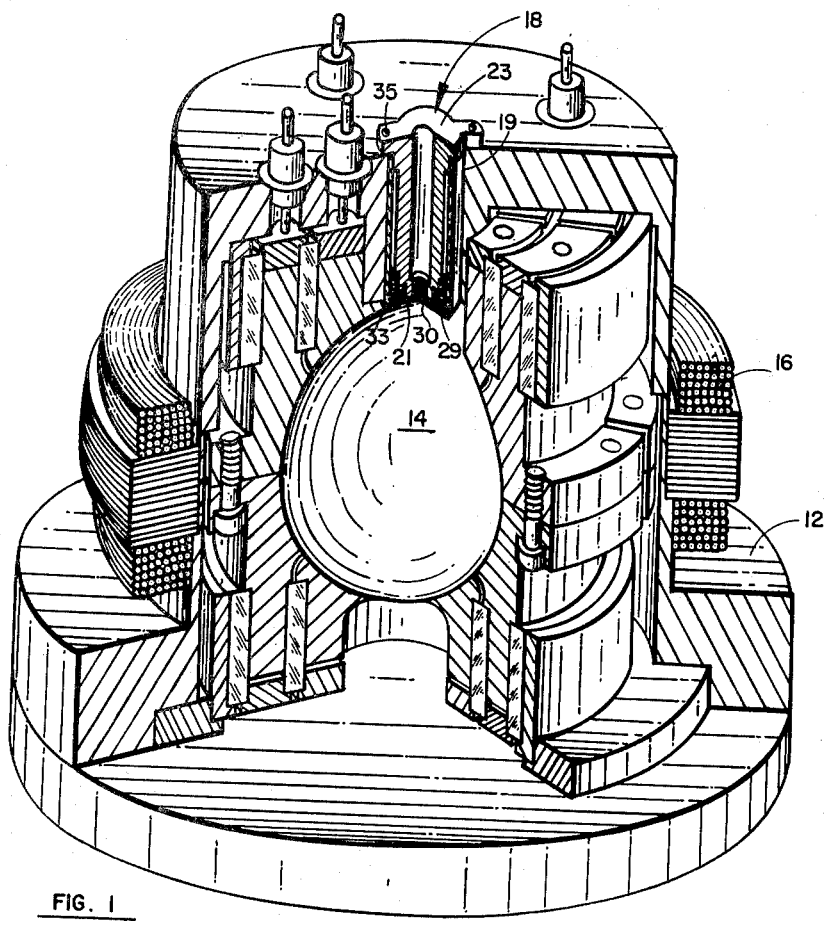
FIG. 1
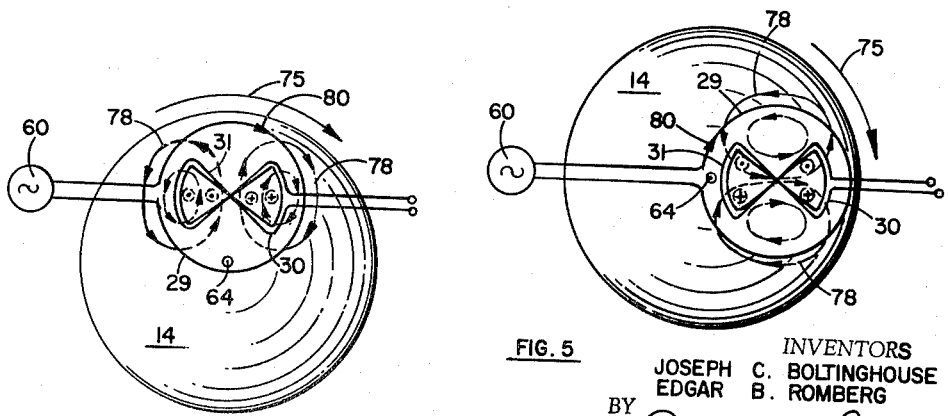
FIG. 4
FIG. 5
INVENTORS
JOSEPH C. BOLTINGHOUSE
EDGAR B. ROMBERG
BY
Edward A. Sokolski
ATTORNEY

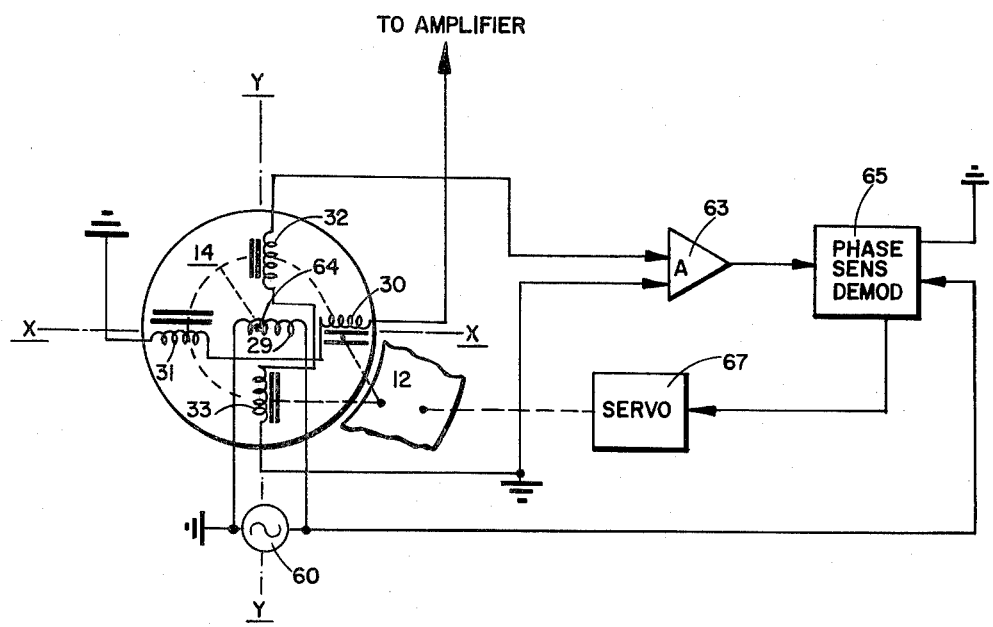
FIG. 6
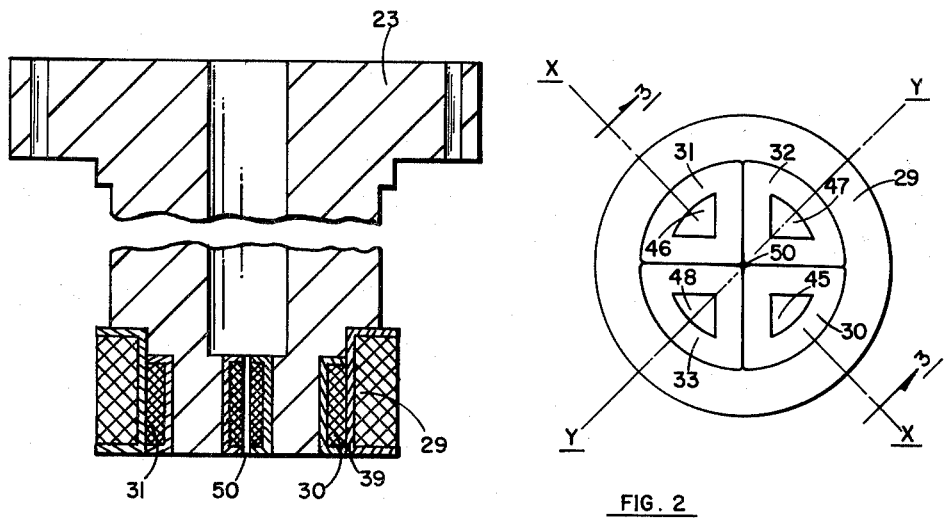
FIG. 3
FIG. 2
INVENTORS
JOSEPH C. BOLTINGHOUSE
EDGAR B. ROMBERG
BY
Edward A. Sokolski
ATTORNEY

United States Patent Office 3,226,983
Patented Jan. 4, 1966

This invention relates to an induction pickoff device and more particularly to such a device capable of sensing deviation of the spin axis of a rotating member from a predetermined reference without using any markings or surface anomaly on the spinning member in detecting such deviation.

Inertial instruments such as free-rotor gyros include a rotating member having three degrees of freedom relative to a case. Such devices generally utilize a spherical bearing for supporting the rotor, this bearing being formed between the rotor and the case. This bearing may be of the fluid, electrostatic, or electromagnetic type. In a precision instrument, it is necessary that the bearing produce little or no coercion of the rotor. In general the coercion is least when the bearing forming surface of the rotor is nearly spherical in shape.

To obtain useful information from an inertial instrument such as a gyroscope, a pickoff device is generally utilized which senses relative motion between the rotor and the case about each of the axes normal to the rotor spin axis. In mechanizing such pickoff devices, which may be of either the capacitive or inductive variety, the prior art invariably utilizes some anomaly or mark on the rotor, with the case mounted pickoff sensing the motion of this anomaly or mark relative thereto. Such a deviation from a true spherical shape, as required in such prior art devices to obtain a useful output signal, results in coercive forces on the rotor which lessen the accuracy of the inertial instrument. To make for higher accuracy, therefore, it would be highly desirable to maintain the exterior of the rotor as a complete uninterrupted spherical surface by eliminating the necessity for having a mark on the rotor for pickoff purposes.

Although fabrication of a precision spherical surface to within a very few microinches of true spherical shape is practicable, fabrication to perfect tolerances is impossible, and any precision ball will have an axis of greatest moment of inertia and axis of least moment of inertia. Experimentation has indicated, however, that the nearly perfect ball will eventually settle on the axis of greatest inertia. With the pickoff devices of the prior art, the pickoff reference which is generally on the rotor must coincide with, or have some fixed predetermined relation to, the major axis of inertia of the rotor. Without some restraint, it is impossible to make the initial spin axis coincide with the major axis of inertia. In a precision inertial instrument, therefore, the rotor must be modified to establish a pronounced major axis of inertia to achieve the desired co-operative relationship between the pickoff device and its reference marking on the rotor. To achieve this desired end result in a precision instrument is a tedious and difficult task.

The device of this invention overcomes the above-enumerated problems of the prior art devices by providing a pickoff device which requires no reference marking or anomaly on the rotor in developing a pickoff signal indicating relative motion between the case and the rotor. This end result is achieved by providing an inductive pickoff which is mounted on the case in close proximity to the rotor, this pickoff including a magnetic core with an excitation coil wound thereon and a pair of sensing coils for each of the pickoff sensing axes. Each sensing coil is wound around a separate pole piece section formed in the magnetic core. The pole piece sections are positioned opposite each other along a sensing axis which is substantially normal to the rotor spin axis.

The excitation coil is excited by an A.-C. power source. Eddy currents are induced from the excitation coil into the proximate surfaces of the rotor. With rotation of the rotor, the sensing coils operate as a linear velocity pickoff, voltages being generated in the coils in accordance with the velocity vector of the rotating conductor relative to the pickoff. With the central axis of the pickoff aligned with the spin axis of the rotor, equal voltages will be generated in each sensing coil of a pair. If these voltages are subtracted, zero output will result. If, however, the central axis of the pickoff is displaced so that it no longer is aligned with the rotor spin, A.-C. voltages will be generated in the sensing coils for the axis about which the displacement has occurred which when subtractively combined will produce an output signal having a phase and amplitude indicative of the sense and magnitude of the displacement. This pickoff signal is obtained without the use of any reference marking or anomaly on the rotor surface.

It is therefore an object of this invention to provide an improved pickoff for use with inertial instruments.

It is a further object of this invention to improve the accuracy of precision inertial instruments.

It is another object of this invention to minimize the error torques generated in a free-rotor inertial instrument.

It is still another object of this invention to provide a pickoff device capable of sensing relative motion between a rotor and a case without using any marking or surface anomaly on the rotor.

It is still a further object of this invention to facilitate the fabrication of precision inertial instruments by eliminating the necessity for making the initial spin axis of the instrument rotor coincide with the major axis of inertia thereof.

Other objects of this invention will become apparent from the following description taken in connection with the accompanying drawings of which, FIG. 1 is a perspective view with partial cutaway section showing the device of the invention as incorporated into a free-rotor gyroscope;

FIG. 2 is a bottom plan view of a preferred embodiment of the device of the invention;

FIG. 3 is a cross-sectional view of the embodiment illustrated in FIG. 2 as viewed along a plane as indicated by the line 3—3 in FIG. 2;

FIGS. 4 and 5 are diagrams illustrating the operation of the device of the invention;

And, FIG. 6 is a schematic diagram illustrating how the device of the invention may be incorporated into a servo system for maintaining the case of an inertial instrument in a balanced position relative to the rotor thereof.

Referring now to FIG. 1, a preferred embodiment of the device of the invention as incorporated into a free-rotor gyroscope is shown. The gyroscope has a case 12 in which a ball-shaped rotor 14 is supported with three degrees of freedom. Ball 14 may be supported by electrostatic means or by a viscous air bearing in accordance with techniques well known in the art.

Rotor 14 is caused to spin about a rotation axis by electrically excited eddy current motor coils 16 which generate eddy currents in the conductive surfaces of rotor 14. As is well known in the art, the magnetic fields produced by the A.-C. current flowing in the motor coils 16 co-act with the magnetic fields produced by the eddy currents generated in rotor 14 to impart a force on the rotor causing it to rotate. Inductive pickoff 18 is mounted in cylindrical portion 19 formed in case 12 and is fixedly attached to the case 12 by means of screws 35 or other suitable means with the excitation coil 29 and the pickoff coils 30–33 (see FIG. 2) in close proximity to the surface of rotor 14. A septum 21 separates the rotor enclosure from the case. This septum may be a thin conductive sheet and is used to completely seal off the chamber enclosing the rotor from the outside atmosphere. This is necessary to enable the maintenance of a vacuum where the rotor is electrostatically supported or to maintain the necessary pressurization where a pressurized air bearing is utilized. By maintaining the pickoff external to the sealed-off rotor chamber, the need for electrical feedthroughs for the pickoff leads is eliminated. The pickoff 18 is positioned so that its central axis is substantially along the rotor spin axis.

Referring now additionally to FIGS. 2 and 3, the details of a preferred embodiment of the device of the invention are illustrated. The pickoff has a magnetic core 23 which is fixedly attached to case 12 by means of bolts 35 (see FIG. 1) or any other suitable means. Excitaton coil 29 is wound along the periphery of the core around bobbin 39. Core 23 is slotted at the bottom end and sensing coils 30, 31, 32, and 33 are wound around the magnetic pole pieces formed in the core by these slots. The sensing coils 30 and 31 are wound around pole pieces 45 and 46 which are positioned opposite each other along an axis, X—X (see FIG. 2) running through the central axis 50 of the pickoff. Similarly the sensing coils 32 and 33 for detecting relative motion between the case and the rotor spin axis about an axis normal to the sensing axis associated with pickoff coils 30 and 31 are wound around pole pieces 47 and 48 and positioned along an axis, Y—Y which runs through axis 50. Sensing coils 30 and 31 have an output signal indicative of rotation of the case relative to the rotor spin axis about a first axis while sensing coils 47 and 48 have an output indicative of rotation of the case relative to the rotor spin axis about an axis normal to said first axis.

The operation of the device of the invention may be explained as follows: Assume for the moment, a conductive surface moving with a linear velocity past a pole piece. As the conductor cuts the magnetic flux lines, an E.M.F. is generated in the conductor such that if a current can flow the resulting force will oppose the motion. In accordance with the well known "righthand rule," a current will flow in the conductor normal to the direction of motion of the conductor and normal to the direction of the flux lines. An armature reaction effect occurs such that the flux from the eddy current induced in the rotor combines with the flux from the magnetic core to give a new flux pattern. The flux density is reinforced in the leading edge of the magnetic pole and diminished in the trailing edge. The total flux is therefore shifted forward in the direction of motion of the rotating conductor. The amount of shift is proportional to the velocity of the rotating conductor, i.e., to the rate at which the flux lines are being cut. With the pair of pickoffs alined along their sensing axes, it can readily be seen that there will be no significant velocity component running from one of the pickoff units towards the other of the pickoff units to produce an increase in flux in one and a decrease in the other. Under such conditions, the two sensing coils will have equal induced E.M.F.'s. The two coils when connected in opposition will therefore produce zero output.

On the other hand, if the axis of a pair of sensing coils is displaced so that it no longer runs through the spin axis of the rotor, the moving conductive rotor will have a velocity vector running from one of the sensing coil pole pieces to the other. This will produce a shift in flux in the direction of the velocity vector from one of the pole pieces to the other thereby producing a greater induced E.M.F. in the coil wound around the pole piece located in the direction of motion. The signal so produced will have a phase and amplitude in accordance with the magnitude and direction of departure of the sensing axis from the rotor spin axis. With the two sensing coils connected in opposite sense, the differential signal produced will reflect the sensed displacement.

For a more analytical description of the operation of the device of the invention, let us now refer to FIGS. 4 and 5. As indicated in the figures, the rotor 14 is spinning about an axis 64 in the direction indicated by arrow 75 in close proximity to the pickoff. The pickoff excitation coil 29 is excited by A.-C. source 60. The sensing coils 30 and 31 for the X axis are shown for illustrative purposes.

Referring to FGI. 4, the pickoff device is shown displaced relative to the spin axis 46 so that the sensing axis of the sensing coils 30 and 31 no longer intersects the spin axis 64. With rotor 14 rotating as indicated by arrow 75, and during any A.-C. half cycle when the current is flowing in excitation coil 29 in the direction indicated by arrow 80, the eddy currents induced on the surface of rotor 14 by virtue of the cutting of the flux lines generated by the current flow in coil 29 will be in the direction indicated by the arrows or lines 78. These eddy currents will generate a magnetic field with flux lines at the assumed half-cycle which run down towards the rotor on the side adjacent the pickoff coil 30 and up from the rotor towards the pickoff on the side adjacent to pickoff coil 31. The E.M.F. induced in pickoff coil 30 by virtue of the cutting of these flux lines with rotation of rotor 14 relative to the pickoff will therefore be in a direction opposite to that induced in pickoff coil 31. With the coils connected in opposition, the summation of these opposite polarity signals will produce an output signal having a magnitude indicative of the magnitude of departure from spin axis 64 and a phase relationship with the output of source 60 indicative of the direction of departure from the spin axis 64.

Referring now to FIG. 5, the pickoff is shown displaced from the spin axis 64 but with the sening axis of coils 30 and 31 still alined with the spin axis (i.e., still in a position where the two axes intersect). Under such conditions, the eddy currents produced on the rotor surface by virtue of the motion of the rotor through the magnetic flux produced by current flow in excitation cail 29 during a half-cycle of the A.-C. excitation in the direction indicated by arrow 80, will be as indicated by lines 78. The eddy currents will in turn produce magnetic flux which will run from the pickoff to the rotor near the bottom portion of sensing coil 30 and from the rotor to the pickoff near the top portion of sensing coil 30. The eddy current produced flux lines will run in the same fashion in the vicinity of sensing coil 31. The net E.M.F. induced in each of the sensing coils will therefore be of the same polarity and magnitude. When summed in the oppositely connected coils, zero output will result.

It thus can be seen that an output signal will be obtained from the pickoff, only when there is a velocity vector due to the rotation of the spinning ball running from one sensing coil to the other. Such a velocity vector will only be present when the sensing axis of the paired coils is displaced from the rotor spin axis.

Referring now to FIG. 6, a schematic diagram illustrating how the device of the invention can be incorporated in a servo system to maintain the rotor and case in a balanced relationship is shown. Rotor 14 is spun about a rotation axis 64 relative to case 12 by means of a motor (not shown). Pickoff sensing coils 30 and 31 are positoned along an axis X—X while sensing coils 32 and 33 are positioned along an axis Y—Y. As long as rotation axis 64 coincides with the central axis of the pickoff, the voltages induced in coils 30 and 31 will be equal and the voltages induced in coils 32 and 33 will be equal. For illustrative purposes, only the circuitry for the pickoffs 32 and 33 positioned along the Y axis is shown. A similar control system would be utilized in conjunction with the pickoffs 30 and 31 along the X axis.

The voltages generated across sensing coils 32 and 33 are subtracted in summing amplifier 63 and fed to phase sensitive demodulator 65. Excitation coil 29 is excited with a signal from A.C. power source 60. Power source 60 is also used as the reference for phase sensitive demodulator 65. The output of phase sensitive demodulator 65 if fed to servo 67 which may be a servo motor. Servo 67 drives case 12 in such a way so as to maintain the Y axis sensing coils 32 and 33 in alinement with the rotor spin axis 64.

Let use assume that case 12 rotates so as to bring the sensing coils 32 and 33 attached thereto to the left-hand side of spin axis 64. Assuming clockwise rotation of rotor 14, there will then be a velocity vector running from pickoff 33 towards pickoff 32. Under such conditions, a differential output signal will result at the output of summing amplifier 63 having an amplitude and a phase relationship with reference source 60 which is indicative of the magnitude and direction of the relative displacement between the pickoff sensing axis and the rotor spin axis. This signal will be detected in phase sensitive demodulator 65 which will produce a D.-C. output signal having an amplitude and a direction in accordance with the input signal fed thereto. This signal will drive servo 67 to cause the servo to restore the case to its original posiiton with the pickoff axis and the rotor spin axis in alinement and thereby zero out the signal being fed to phase sensitive demodulator 65. With the pickoffs in their original position, the outputs therefrom will again be equal and no input signal will be fed to phase sensitive demodulator 65 from amplifier 63.

The shape and size of the pickoffs are not critical, the only important consideration being that they be identical in both size and electrical characteristics. The pickoffs, of course, must be properly aligned with each other to perform their pickoff function properly. It is to be noted, however, that the location of the major axis of inertia of the rotor has no particular significance in the operation device of the invention in view of the fact that the rotor spin axis need not be specifically defined with relationship to any marking or anomaly on the surface of the rotor.

The device of this invention thus provides a simple yet highly effective means for obtaining a pickoff signal indicating the relative position between a case and its associated rotor. Precision of the inertial instrument in which the device of the invention is utilized can be significantly enhanced in view of the elimination of the requirement for any marking or surface anomaly on the spinning rotor.

Although the invention has been described and illustrated in detail, it is to be clearly understood that the same is by way of illustration and example only and is not to be taken by way of limitation, the spirit and scope of this invention being limited only by the terms of the appended claims.

We claim:

1. An induction pickoff device comprising
   a magnetic core, said magnetic core being slotted at the bottom end thereof to form at least a first pair of pole pieces, said pole pieces being positioned opposite each other along an axis running through the central axis of the pickoff, said pole pieces further being symmetrically arranged about said pickoff device central axis, said magnetic core is slotted to additionally form at least a second pair of pole pieces, said second pair of pole pieces being positioned along a second axis normal to said first pole piece axis, said second axis running through the pickoff central axis and being mutually perpendicular to said first pole piece axis and said central axis,
   a sensing coil wound around each of said first pole pieces, said sensing coils being connected in series opposing relationship,
   a second pair of sensing coils wound around each of said second pair of pole piece, said second pair of sensing coils being connected in series opposing relationship, and
   an excitation coil wound on said magnetic core, the center of said excitation coil coinciding with the central axis of said pickoff device.

2. An induction pickoff device for use in sensing deviation of the spin axis of a rotating member from the central axis of the pickoff device, said pickoff device being mounted on a fixed member in close proximity to said rotating member, comprising
   an excitation coil concentric with the central axis of the pickoff,
   a magnetic core,
   a pair of sensing windings wound around said core symmetrically arranged along a sensing axis on opposite sides of the central axis of the pickoff, said sensing windings being connected in series opposing relationship,
   a voltage source connected to said excitation coil, and
   means responsively connected to receive the output of said sensing coils for deriving therefrom a signal indicative of the magnitude and direction of departure of the sensing axis of the pickoff device from the spin axis of said rotating member.

3. In an inertial instrument having a case and a rotor supported within said case on a spherical bearing with three degrees of freedom, said rotor being rotated about a rotation axis relative to said case,
   an induction pickoff mounted on said case in close proximity to said rotor, said pickoff being positioned with its central axis substantially along the rotor rotation axis, said induction pickoff comprising
   at least one pair of sensing coils, each sensing coil being positioned opposite its paired coil along a sensing axis, said sensing axis being substantially normal to the rotor's rotation axis,
   an excitation coil, the center of said coil being located along the pickoff central axis, said pickoff central axis being normal to said sensing axis and midway between each of said paired sensing coils,
   an A.-C. source connected to said excitation coil, said sensing coils being connected in series opposing relationship, and
   means responsive to the output of said sensing coils for producing a signal indicative of the magnitude and direction of departure of the sensing axis from the rotation axis of said rotor.

4. In an inertial instrument having a case and a rotor supported within said case with three degrees of freedom on a spherical bearing formed between opposing spherical surfaces of said rotor and said case, said rotor being rotated relative to said case about a rotation axis,
   an inductive pickoff mounted on said case in close proximity to said rotor, said induction pickoff comprising
   a magnetic core slotted to form two pairs of pole piece sections, each pole piece section of one of said pairs being positioned opposite its paired section along a first axis, each pole piece section of the other of said pairs being positioned opposite its paired section along a second axis normal to said first axis,
   a sensing coil wound around each of said pole piece sections,
   an excitation coil wound around said magnetic core, the center of said excitation coil being located along the pickoff central axis, said pickoff central axis being normal to said first and second axes and located midway between both said pairs of pole piece sections,
   an A.-C. source connected to said excitation coil, each of said pairs of sensing coils being connected in series opposing relationship,
   amplifier means connected to receive the output of said sensing coils, and
   means responsive to the output of said amplifier means for producing signals indicative of the magnitude and direction of departure of the pickoff central axis from the rotation axis of said rotor.

5. In an inertial instrument having a case and a rotor supported within said case with three degrees of freedom on a spherical bearing formed between opposing spherical surfaces of said rotor and said case, said rotor being rotated relative to said case about a rotation axis, an inductive pickoff mounted on said case in close proximity to said rotor, said induction pickoff comprising two pairs of sensing coils, each sensing coil of one of said pairs being positioned opposite its paired coil along a first axis, each sensing coil of the other of said pairs being positioned opposite its paired coil along a second axis normal to said first axis, an excitation coil, the center of said excitation coil being located along the pickoff central axis, said pickoff central axis being normal to said first and second axes and located midway between both said pairs of sensing coils, an alternating voltage source connected to said excitation coil, each of said pairs of sensing coils being connected in series opposing relationship, means responsive to the output of each of said pairs of sensing coils for producing signals indicative of the magnitude and direction of departure of the pickoff central axis from the rotation axis of said rotor, servo means responsive to the output of said means for producing a signal indicative of departure of the pickoff central axis for maintaining said case and rotor in a predetermined position relative to each other with said pickoff central axis substantially in alinement with said rotor rotation axis.

References Cited by the Examiner

UNITED STATES PATENTS 2,270,876   1/1942   Esval et al. _____ 74—5.6 X
3,017,777   1/1962   Haeussermann _____ 74—5

BROUGHTON G. DURHAM, *Primary Examiner.*